United States Patent Office 2,893,113
Patented July 7, 1959

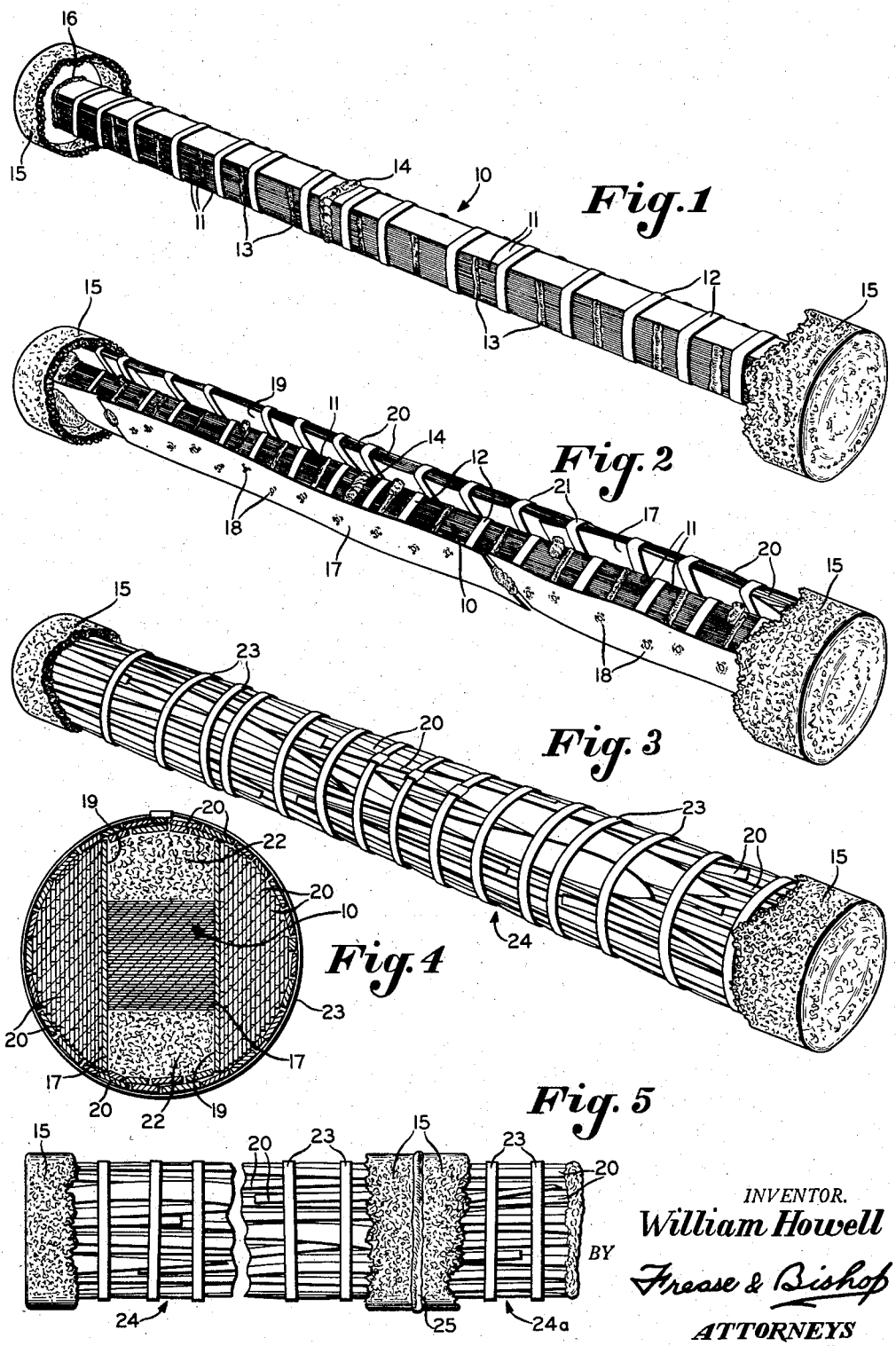

2,893,113

RECOVERY OF TITANIUM FINES AND MANUFACTURE OF ELECTRODES THEREFROM

William Howell, Warren, Ohio, assignor to Mallory-Sharon Titanium Corporation, Niles, Ohio, a corporation of Delaware Application August 19, 1955, Serial No. 529,516

5 Claims. (Cl. 29—184)

The invention relates to the recovery of finely divided titanium scrap such as turnings, borings and chips, by utilizing the same in the manufacture of consumable titanium electrodes for use in the production of titanium ingots, and more particularly to construction of such an electrode and the method of making the same.

In the fabrication of various articles from titanium sheets, plates, bars and the like, a considerable amount of the resulting scrap is in the form of turnings, borings, chips and other fines. As titanium is a valuable metal, this titanium scrap has a substatnial value, and it is economically important that the same be utilized in the best possible manner.

Because of the characteristics of titanium, and the manner in which ingots of the same are produced, it is not possible to use titanium scrap in the same manner ordinarily used for the recovery of other metal scrap.

While methods have been devised for using certain types of titanium scrap, in relatively large pieces, no practical method has heretofore been developed for utilizing such titanium fines in the production of titanium ingots.

Therefore it is a primary object of the invention to provide for the recovery of titanium fines in the production of titanium ingots.

Another important object is to provide a method of utilizing titanium fines in the manufacture of consumable titanium electrodes.

A further object is to provide a consumable titanium electrode formed partially of titanium fines, for use in an electric arc furnace for the production of titanium ingots.

A still further object is to provide a consumable titanium electrode having a rigid core with trough formed thereon and titanium fines, such as borings, turnings and chips, located in said troughs.

A still further object is to provide such an electrode in which the rigid core and the troughs containing the titanium fines are surrounded by layers of elongated pieces of titanium sheet scrap of various lengths and widths, overlapping each other and bound circumferentially upon the core and troughs by titanium straps.

Another object of the invention is to provide a consumable titanium electrode of the character referred to, in which titanium skulls are welded to the ends thereof.

A further object is to provide for the welding of such electrodes end to end.

The above and other objects and advantages which may be hereinafter pointed out, or which will be apparent to those skilled in the art, may be attained by the parts, constructions, arrangements, combinations, methods, steps, operations and procedures comprising the present invention, the nature of which is set forth in the following general statement, a preferred structural and procedural embodiment of which, illustrative of the best mode in which applicant contemplates applying the principles, is illustrated in the accompanying drawing and described in detail in the following description, and which is particularly and distinctly set forth and pointed out in the appended claims forming part hereof.

In general terms, the nature of the present invention may be stated as including the provision of a consumable titanium electrode for the production of titanium ingots, by utilizing titanium fines.

The electrode includes a rigid titanium core, having troughs formed thereon and filled with titanium fines such as borings, turnings and chips, elongated pieces of titanium sheet scrap surrounding the core and the troughs of titanium fines thereon, said elongated pieces of sheet scrap being of various lengths and widths and overlapping each other, and bound circumferentially around the core and the troughs, the titanium core, troughs, titanium fines and elongated pieces of sheet scrap having the same or desired analyses.

Skulls, remaining from the casting of titanium ingots or the like, are welded to opposite ends of the core, and two or more of the ingots thus formed may be welded together end to end.

The invention also contemplates the method of constructing a consumable titanium electrode for the production of titanium ingots in a consumable electrode, electric arc furnace, which comprises providing a rigid titanium core and forming longitudinal troughs upon the sides thereof, filling said troughs with titanium fines, and placing a plurality of elongated pieces of titanium sheet scrap disposed around the core and troughs and binding the same thereto by titanium binding straps, circumferentially binding the elongated scrap material to the core and troughs at spaced intervals, and welding titanium skulls to opposite ends of the core.

Referring now to the accompanying drawing which is illustrative of a preferred embodiment of the invention, and in which similar numerals refer to similar parts throughout the several views;

Fig. 1 is a perspective view of a rigid titanium core having titanium skulls welded to opposite ends thereof;

Fig. 2 is a perspective view of the core shown in Fig. 1, with relatively wide straps of titanium sheet material spot welded to opposite sides of the core, showing the manner in which elongated pieces of titanium sheet material are built up and bound to one side of the troughs thus formed;

Fig. 3 is a perspective view of a completed consumable titanium electrode constructed in accordance with the invention;

Fig. 4 is an enlarged, transverse, sectional view through the electrode shown in Fig. 3; and Fig. 5 is a side elevation showing the manner in which the electrodes may be welded together end to end.

Referring now to the embodiment of the invention illustrated, in the formation of a consumable titanium electrode, the first step is the production of a rigid titanium core. The core, indicated generally at 10, is preferably rectangular in cross section, and, as shown in the drawing, may be formed of a plurality of rectangular pieces 11 of titanium sheet or plate material, of uniform size and shape, rigidly secured together by spaced titanium straps 12, and by edge welding as indicated at 13.

The core may be formed of two or more such sections placed end to end and butt-welded together as indicated at 14. Titanium skulls 15, resulting from the casting of previous titanium ingots or the like, are welded to opposite ends of the core thus formed, as indicated at 16. As shown in Fig. 1, it will be apparent that the core 10 is of relatively smaller cross section than the skulls 15 which form the ends of the electrode.

In the next step of the method of constructing the electrode, elongated strips 17 of titanium sheet material, of a width relatively greater than the cross section of the core 10, are spot welded, as indicated at 18, to opposite sides of the core 10, so that the edges of the strips 17 extend considerably beyond the core at opposite sides, forming the oppositely disposed troughs 19 located on opposite sides of the core.

After these troughs have thus been formed upon the core, elongated pieces of titanium sheet material indicated at 20, which may be of various lengths and widths, are built up upon the outer side of each of the relatively wide strips 17 and bound thereto as by the titanium straps 21.

The troughs 19 are then filled with titanium fines 22, such as borings, turnings, chips or other fine titanium scrap, and additional elongated pieces of titanium sheet scrap 20 are placed over the same and bound circumferentially by the titanium straps 23. Thus the completed electrode as indicated at 24 in Fig. 3 is produced.

After such an electrode has been consumed to the point where it is no longer practically usable, as indicated at 24a in Fig. 5, the skull 15 at the unconsumed end thereof, may be butt-welded to the skull 15 on one end of a completed electrode, as indicated at 25, so that the unconsumed portion 24a of the electrode may thus be used up in the production of titanium ingots.

All of the titanium scrap used in the electrode, that is the core, the strips 17 and sheet scrap 20, the straps 21 and 23, and the skulls 15 may be of the same or of any desired analyses so that titanium ingots of desired analysis may be produced therefrom.

From the above it will be obvious that a consumable titanium electrode and method of making the same is provided, which permits the recovery of otherwise unusable titanium fines, such as turnings, borings, chips and the like, for the manufacture of titanium ingots, whereby such titanium fines may be completely utilized.

It will also be seen that by welding skulls to opposite ends of the electrode, unused portions of electrodes may be welded to complete electrodes in order to completely use all of the titanium scrap in the production of ingots.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of making a consumable titanium electrode from titanium scrap material, which consists in the steps of providing a rigid laminated core of a plurality of rectangular pieces of titanium sheet material of uniform size and shape stacked in metal-to-metal, surface-to-surface contact, the stacked pieces having aligned edges, securing adjacent pieces together by edge welding and by spaced titanium straps, welding titanium skulls centrally to opposite ends of said core, the cross section of the core being considerably less than that of the skulls, spot welding relatively wide strips of titanium sheet material to opposite sides of the core forming troughs on two opposite sides of the core, binding elongated pieces of titanium sheet material of various lengths and widths upon the outer sides of the troughs with titanium straps, so as to substantially conform to the curvature of the skulls, placing titanium fines in said troughs, placing additional elongated pieces of titanium sheet scrap of various widths and lengths over the fines in said troughs with end and edge portions of said additional elongated pieces of sheet scrap overlapping, and circumferentially binding said additional elongated pieces of sheet scrap with titanium straps.

2. A consumable titanium electrode formed from titanium scrap material, including a rigid laminated core comprising a stack of rectangular pieces of titanium sheet material of uniform size and shape in metal-to-metal, surface-to-surface contact, the stacked pieces having aligned edges, adjacent pieces being secured together by edge welding and by spaced titanium straps, titanium skulls welded to the ends of said core, the cross section of the skulls being considerably greater than the cross section of the core, relatively wide strips of titanium sheet material welded to opposite sides of the core forming troughs on two opposite sides of the core, elongated pieces of titanium sheet material of various lengths and widths bound upon the outer sides of the troughs with titanium straps and substantially conforming to the curvature of the skulls, titanium fines located in said troughs, additional elongated pieces of titanium sheet scrap of various widths and lengths located over said fines with end and edge portions thereof overlapping, and titanium straps circumferentially bound around said additional elongated pieces of sheet scrap.

3. The method of making a consumable titanium electrode from titanium scrap material, which consists in the steps of providing a rigid laminated core of a plurality of rectangular pieces of titanium sheet material of uniform size and shape stacked in metal-to-metal, surface-to-surface contact, the stacked pieces having aligned edges, securing adjacent pieces together by edge-welding and by spaced titanium straps, welding titanium skulls centrally to opposite ends of said core, the cross section of the core being considerably less than that of the skulls, spot-welding relatively wide strips of titanium sheet material to opposite sides of the core forming troughs on two opposite sides of the core, binding elongated pieces of titanium sheet material of various lengths and widths upon the outer sides of the troughs with titanium straps so as to substantially conform to the curvature of the skulls, placing titanium fines in said troughs, placing additional elongated pieces of titanium sheet scrap of various widths and lengths over said elongated pieces of titanium sheet material on the sides of the troughs and over the fines in said troughs with end and edge portions of said additional elongated pieces of sheet scrap overlapping, and circumferentially binding said additional elongated pieces of sheet scrap with titanium straps.

4. A consumable titanium electrode formed from titanium scrap material, including a rigid laminated core comprising a stack of rectangular pieces of titanium sheet material of uniform size and shape in metal-to-metal, surface-to-surface contact, the stacked pieces having aligned edges, adjacent pieces being secured together by edge welding and by spaced titanium straps; titanium skulls welded to the ends of said core, the cross section of the skulls being considerably greater than the cross section of the core, relatively wide strips of titanium sheet material welded to opposite sides of the core forming troughs on two opposite sides of the core, elongated pieces of titanium sheet material of various lengths and widths bound upon the outer sides of the troughs with titanium straps and substantially conforming to the curvature of the skulls, titanium fines located in said troughs, additional elongated pieces of titanium sheet scrap of various widths and lengths located over said elongated pieces of titanium sheet material on the outer sides of the troughs and over said fines with end and edge portions thereof overlapping, and titanium straps circumferentially bound around said additional elongated pieces of sheet scrap.

5. The method as set forth in claim 1, which includes placing two of said consumable titanium electrodes together end-to-end and welding the abutting skulls thereof together.

References Cited in the file of this patent

UNITED STATES PATENTS

| | | |
|---|---|---|
| 99,574 | Jones | Feb. 8, 1870 |
| 162,159 | Durfee | Aug. 20, 1875 |
| 274,019 | Murphy | Mar. 13, 1883 |
| 332,405 | Libby | Dec. 15, 1885 |
| 524,294 | Baugh | Aug. 7, 1894 |
| 1,742,111 | Weishan | Dec. 31, 1929 |
| 2,792,621 | Howell | May 21, 1957 |

UNITED STATES PATENT OFFICE

CERTIFICATE OF CORRECTION

Patent No. 2,893,113

July 7, 1959

William Howell

It is hereby certified that error appears in the above numbered patent requiring correction and that the said Letters Patent should read as corrected below.

In the grant, lines 2 and 12, and in the heading to the printed specification, lines 4 and 5, for "Mallory-Sharon Titanium Corporation", each occurrence, read -- Mallory-Sharon Metals Corporation --.

Signed and sealed this 10th day of November 1959.

(SEAL)
Attest:

KARL H. AXLINE
Attesting Officer

ROBERT C. WATSON
Commissioner of Patents